(12) United States Patent
Nagai et al.

(10) Patent No.: US 9,666,888 B2
(45) Date of Patent: May 30, 2017

(54) COMBINED POWER GENERATION SYSTEM AND UNIT, METHOD, AND PROGRAM FOR CONTROLLING THE SAME

(71) Applicant: MITSUBISHI HITACHI POWER SYSTEMS, LTD., Kanagawa (JP)

(72) Inventors: Takuma Nagai, Yokohama (JP); Hiroyuki Ozawa, Yokohama (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 37 days.

(21) Appl. No.: 14/923,926

(22) Filed: Oct. 27, 2015

(65) Prior Publication Data

US 2016/0126570 A1  May 5, 2016

(30) Foreign Application Priority Data

Oct. 30, 2014  (JP) ................. 2014-221582

(51) Int. Cl.
*H01M 8/04* (2016.01)
*H01M 8/04746* (2016.01)
*H01M 8/04089* (2016.01)
*H01M 8/0438* (2016.01)
*H01M 8/0662* (2016.01)
(Continued)

(52) U.S. Cl.
CPC ... *H01M 8/04746* (2013.01); *H01M 8/04097* (2013.01); *H01M 8/04111* (2013.01); *H01M 8/04228* (2016.02); *H01M 8/04303* (2016.02); *H01M 8/04432* (2013.01); *H01M 8/04783* (2013.01); *H01M 8/0662* (2013.01); *H01M 2008/1293* (2013.01); *H01M 2250/407* (2013.01); *Y02E 60/563* (2013.01)

(58) Field of Classification Search
CPC ......... H01M 8/04223; H01M 8/04097; H01M 8/04432; H01M 8/04746; H01M 8/04662; H01M 8/04111; H01M 8/04783; H01M 8/04303; H01M 8/04228
See application file for complete search history.

(56) References Cited

U.S. PATENT DOCUMENTS 6,413,662 B1 * 7/2002 Clingerman ...... H01M 8/04223
429/429
2007/0166598 A1  7/2007 Joos et al.

FOREIGN PATENT DOCUMENTS

| JP | 4772470 | 9/2011 |
| JP | 5446184 | 3/2014 |
| JP | 2014-89823 | 5/2014 |

* cited by examiner

*Primary Examiner* — Jacob Amick
(74) *Attorney, Agent, or Firm* — Wenderoth, Lind & Ponack, L.L.P.

(57) ABSTRACT

The system includes an exhaust fuel gas line, an exhaust-fuel-gas supplying line, a recirculating line that circulates the exhaust fuel gas to the SOFC, a shut-off valve in a vent line that splits off on the upstream side of the branching point, an orifice on the downstream side of the shut-off valve, a water supplying portion that supplies water to the recirculating line, and a DPX that measures the system pressure difference of the SOFC, and, when stopping power generation by the SOFC or when power generation by the SOFC comes to an abnormal stop, the shut-off valve is opened, while causing a predetermined amount of pressure loss in the vent line by using the orifice, and thus, the water flow volume of the water supplying portion is controlled so that the pressure difference measured by the DPX reaches a predetermined value.

9 Claims, 5 Drawing Sheets

(51) Int. Cl.
*H01M 8/04111* (2016.01)
*H01M 8/04303* (2016.01)
*H01M 8/04228* (2016.01)
*H01M 8/124* (2016.01)

COMBINED POWER GENERATION SYSTEM AND UNIT, METHOD, AND PROGRAM FOR CONTROLLING THE SAME

CROSS-REFERENCE TO RELATED APPLICATIONS

This application is based on Japanese Patent Application No. 2014-221582, the contents of which are incorporated herein by reference.

TECHNICAL FIELD

The present invention relates to a combined power generation system and to a unit, a method, and a program for controlling the same.

BACKGROUND ART

Fuel cells are power generation devices that utilize a power generation system based on electrochemical reactions, and have characteristics such as excellent power generation efficiency, environmental compatibility, and so forth. Such fuel cells are formed of a fuel electrode, which is a fuel-side electrode, an air electrode, which is an air (oxidant)-side electrode, and an electrolyte that is disposed between them and that allows only ions to pass therethrough, and various systems have been developed in accordance with types of electrolytes.

Among these, solid oxide fuel cells (hereinafter, referred to as "SOFC") are fuel cells that employ ceramics, such as zirconia ceramics or the like, as an electrolyte and that are operated by using, as fuel, hydrogen and hydrocarbon-based gas, such as carbon monoxide, methane or the like, gas generated by means of equipment that gasifies carbonaceous raw materials such as coal or the like, city gas, natural gas, or mixed gas containing a plurality of these components. Such an SOFC enables power generation with high power generation efficiency, for example, by constructing a combined power generation system in combination with an internal combustion engine, such as a micro gas turbine (hereinafter, referred to as "MGT") or the like.

In SOFCs, a technology has been under consideration in which, when power generation is stopped or tripped, a fuel-gas supplying system, an oxidizing-gas supplying system, a fuel-gas exhausting system, and an oxidizing-gas exhausting system are shut off, thus creating a state in which fuel gas and compressed oxidizing gas are contained in the SOFC system, and the SOFC is protected at this time by controlling the system pressure difference between the fuel system and the air system associated with stopping power generation by purging inert gas, such as nitrogen, onto the fuel electrode.

Patent Literature 1 described below discloses a technology used in a combined power generation system in which an SOFC and gas-turbine power generation equipment are combined for supplying pressure adjusting gas, such as reducing gas, nitrogen gas, or the like, in order to prevent a pressure drop associated with a temperature drop in the system in the case in which power generation is stopped, a fuel supplying system and an oxidizing-gas supplying system are shut off, and aeration gas is contained inside the SOFC system.

Patent Literature 2 described below discloses a technology used in a power generation system, having a vaporizer that vaporizes mixed liquid of fuel and water when the operation of power generating cells is stopped and a reformer that generates reformed gas containing hydrogen gas and carbon monoxide gas from the mixed gas, for adjusting internal pressures of individual channels, namely, an air channel, a fuel channel, an off-gas channel, and a water channel, by setting the vaporizer temperature at a higher temperature than the boiling point of the water and by making the water pass through the vaporizer to form water vapor.

Patent Literature 3 described below discloses a technology that maintains the internal pressures of fuel cells at atmospheric pressure by replenishing fuel gas, reducing gas, or inert gas.

CITATION LIST

Patent Literature

{PTL 1} Japanese Unexamined Patent Application, Publication No. 2014-89823
{PTL 2} Publication of Japanese Patent No. 4772470
{PTL 3} Publication of Japanese Patent No. 5446184

SUMMARY OF INVENTION

Technical Problem

However, to control the pressure difference by using nitrogen when power generation is stopped, because the amount of nitrogen used is increased, there has been a problem in that introduction of the SOFC system is limited to a site where satisfactory nitrogen utility equipment can be prepared, which is a factor that impedes the marketability thereof. In addition, there is a problem in that, because running costs associated with nitrogen consumption are increased, nitrogen consumption is suppressed as much as possible, even at sites equipped with equipment for utilizing nitrogen, and thus, the economic efficiency is decreased.

In addition, as in Patent Literature 2 described above, in the case in which water vapor is used, it is necessary to provide a vaporizer, and thus, it is not possible to solve the economic efficiency problems.

The present invention has been conceived in order to solve the above-described problems, and an object thereof is to provide a combined power generation system with which equipment costs and running costs can be suppressed and to provide a unit, a method, and a program for controlling the same.

Solution to Problem

A first aspect of the present invention is a control unit of a combined power generation system that combines a fuel cell and an internal combustion engine, the combined power generation system including an exhaust fuel gas line that feeds exhaust fuel gas from the fuel cell by means of a blower; an exhaust-fuel-gas supplying line that splits off from a branching point of the exhaust fuel gas line and that supplies the exhaust fuel gas to the internal combustion engine; a recirculating line that splits off from the branching point and that circulates the exhaust fuel gas to the fuel cell; a shut-off valve that is provided in a vent line that splits off on an upstream side of the branching point; a pressure loss means that is provided on a downstream side of the shut-off valve in the vent line; a water supplying means for supplying liquid-phase water to the recirculating line; and a system-pressure-difference measuring means for measuring a pressure difference between an air system and a fuel system of the fuel cell, wherein, when stopping power generation by the fuel cell or when the power generation by the fuel cell comes to an abnormal stop, the control unit opens the shut-off valve, while causing a predetermined amount of pressure loss in the vent line by using the pressure loss means, and thus controls a water flow volume of the water supplying means so that the pressure difference measured by the system-pressure-difference measuring means reaches a predetermined value.

With the first aspect of the present invention, in the combined power generation system that combines the fuel cell and the internal combustion engine and that is equipped with the exhaust fuel gas line that feeds the exhaust fuel gas from the fuel cell by means of the blower, the exhaust-fuel-gas supplying line that splits off from the branching point of the exhaust fuel gas line and that supplies the exhaust fuel gas to the internal combustion engine, and the recirculating line that splits off from the branching point and that circulates the exhaust fuel gas to the fuel cell, when stopping power generation by the fuel cell or when power generation by the fuel cell comes to an abnormal stop, the pressure loss means on the downstream side of the shut-off valve provided in the vent line that splits off from the upstream side of the branching point causes the predetermined amount of pressure loss in the vent line, the shut-off valve of the vent line is opened, and thus, the water flow volume of the liquid-phase water supplied to the recirculating line is controlled so that the pressure difference between the air system and the fuel system of the fuel cell reaches the predetermined value.

The water supplied from the recirculating line is vaporized by the high-temperature exhaust fuel gas (for example, 250 to 500° C.) circulating in the recirculating line to form vapor and is supplied to the fuel-cell side. The fuel side is maintained at a positive pressure in this way, and the system pressure difference between the air system and the fuel system of the fuel cell is controlled by using water.

With this configuration, because water, which is lower cost than nitrogen, is used to control the system pressure difference between the air system and the fuel system of the fuel cell, the running cost thereof is suppressed, and thus, a high economic efficiency is achieved. In addition, storage of water is also easy. In addition, cost reduction is achieved by preventing nitrogen from being supplied from a recirculating line.

Although an amount of water ($H_2O$) equal to or greater than a certain amount is required to prevent carbon deposition in the fuel electrode (anode), because water is supplied in the first aspect of the present invention, a sufficient amount of water can also be ensured from the viewpoint of carbon deposition prevention.

In the control unit of the combined power generation system according to the first aspect of the present invention, the pressure of the fuel system may be adjusted by opening/closing the shut-off valve or by controlling the water flow volume of the water supplying means.

With the above-described aspect, although back pressure cannot be adjusted during an interlock or trip operation in the case in which the internal combustion engine has failed or the like, it is possible to adjust the pressure on the water supply side by shutting the shut-off valve of the vent line. Because the pressure can be adjusted on the water supply side by shutting the shut-off valve of the vent line, it is possible to quickly respond to an increase in the pressure on the fuel side by intermittently operating the shut-off valve. In addition, a shut-off valve is lower cost than a control valve, and the cost thereof is relatively low.

In the control unit of the combined power generation system according to the first aspect of the present invention, it is preferable that the water supplying means be equipped with a spraying means for supplying the water by means of spraying.

With the above-described aspect, by supplying water to the recirculating line by spraying the water, vaporization thereof is facilitated, and the pressure difference can be controlled in a simple manner by using water.

In the control unit of the combined power generation system according to the first aspect of the present invention, the pressure of the fuel system may be adjusted by controlling the water flow volume from the water supplying means and also by controlling a nitrogen-supply flow volume to the recirculating line.

With the above-described aspect, it is possible to control the system pressure difference in a short period of time by using both water and nitrogen to be supplied to the recirculating line.

With the control unit of the combined power generation system according to the first aspect of the present invention, in a case in which power generation by the fuel cell comes to an abnormal stop and containment is required, the pressure of the fuel system may be adjusted by supplying water from the water supplying means, when the pressure of the fuel system becomes lower than a pressure of the air system by an amount equal to or greater than a predetermined pressure.

With the above-described aspect, in the case in which the fuel system pressure becomes lower than the air system pressure by an amount equal to or greater than the predetermined pressure when containment is required, and thus, the system pressure difference is increased, it is possible to adjust the fuel system pressure in a simple manner by supplying the water.

With the control unit of the combined power generation system according to the first aspect of the present invention, in a case in which power generation by the fuel cell comes to an abnormal stop and containment is required, the pressure of the fuel system may be adjusted by opening the shut-off valve, when the pressure of the fuel system becomes greater than the pressure of the air system by an amount equal to or greater than a predetermined pressure.

With the above-described aspect, in the case in which the fuel system pressure becomes greater than the air system pressure by an amount equal to or greater than the predetermined pressure when containment is required, and thus, the system pressure difference is increased, it is possible to adjust the fuel system pressure in a simple manner by opening the shut-off valve.

A second aspect of the present invention provides a combined power generation system provided with any one of the above-described control units.

A third aspect of the present invention is a control method of a combined power generation system that combines a fuel cell and an internal combustion engine and that is equipped with an exhaust fuel gas line that feeds exhaust fuel gas from the fuel cell by means of a blower, an exhaust-fuel-gas supplying line that splits off from a branching point of the exhaust fuel gas line and that supplies the exhaust fuel gas to the internal combustion engine, a recirculating line that splits off from the branching point and that circulates the exhaust fuel gas to the fuel cell, a shut-off valve that is provided in a vent line that splits off on an upstream side of the branching point, a pressure loss means that is provided on a downstream side of the shut-off valve in the vent line, a water supplying means for supplying liquid-phase water to the recirculating line, and a system-pressure-difference measuring means for measuring a pressure difference between an air system and a fuel system of the fuel cell, wherein, when stopping power generation by the fuel cell or when the power generation by the fuel cell comes to an abnormal stop, the control method opens the shut-off valve, while causing a predetermined amount of pressure loss in the vent line by using the pressure loss means, and thus controls a water flow volume of the water supplying means so that the pressure difference measured by the system-pressure-difference measuring means reaches a predetermined value.

A fourth aspect of the present invention is a control program of a combined power generation system that combines a fuel cell and an internal combustion engine and that is equipped with an exhaust fuel gas line that feeds exhaust fuel gas from the fuel cell by means of a blower, an exhaust-fuel-gas supplying line that splits off from a branching point of the exhaust fuel gas line and that supplies the exhaust fuel gas to the internal combustion engine, a recirculating line that splits off from the branching point and that circulates the exhaust fuel gas to the fuel cell, a shut-off valve that is provided in a vent line that splits off on an upstream side of the branching point, a pressure loss means that is provided on a downstream side of the shut-off valve in the vent line, a water supplying means for supplying liquid-phase water to the recirculating line, and a system-pressure-difference measuring means for measuring a pressure difference between an air system and a fuel system of the fuel cell, wherein, when stopping power generation by the fuel cell or when the power generation by the fuel cell comes to an abnormal stop, the control program causes a computer to execute control in which the shut-off valve is opened, while causing a predetermined amount of pressure loss in the vent line by using the pressure loss means, and thus, a water flow volume of the water supplying means is controlled so that the pressure difference measured by the system-pressure-difference measuring means reaches a predetermined value.

Advantageous Effects of Invention

The present invention affords an advantage in that it is possible to control combined power generation equipment while suppressing equipment costs and running costs thereof.

DESCRIPTION OF EMBODIMENT

An embodiment of a combined power generation system according to the present invention and a unit, a method, and a program for controlling the same will be described below with reference to the drawings.

Figure 1:
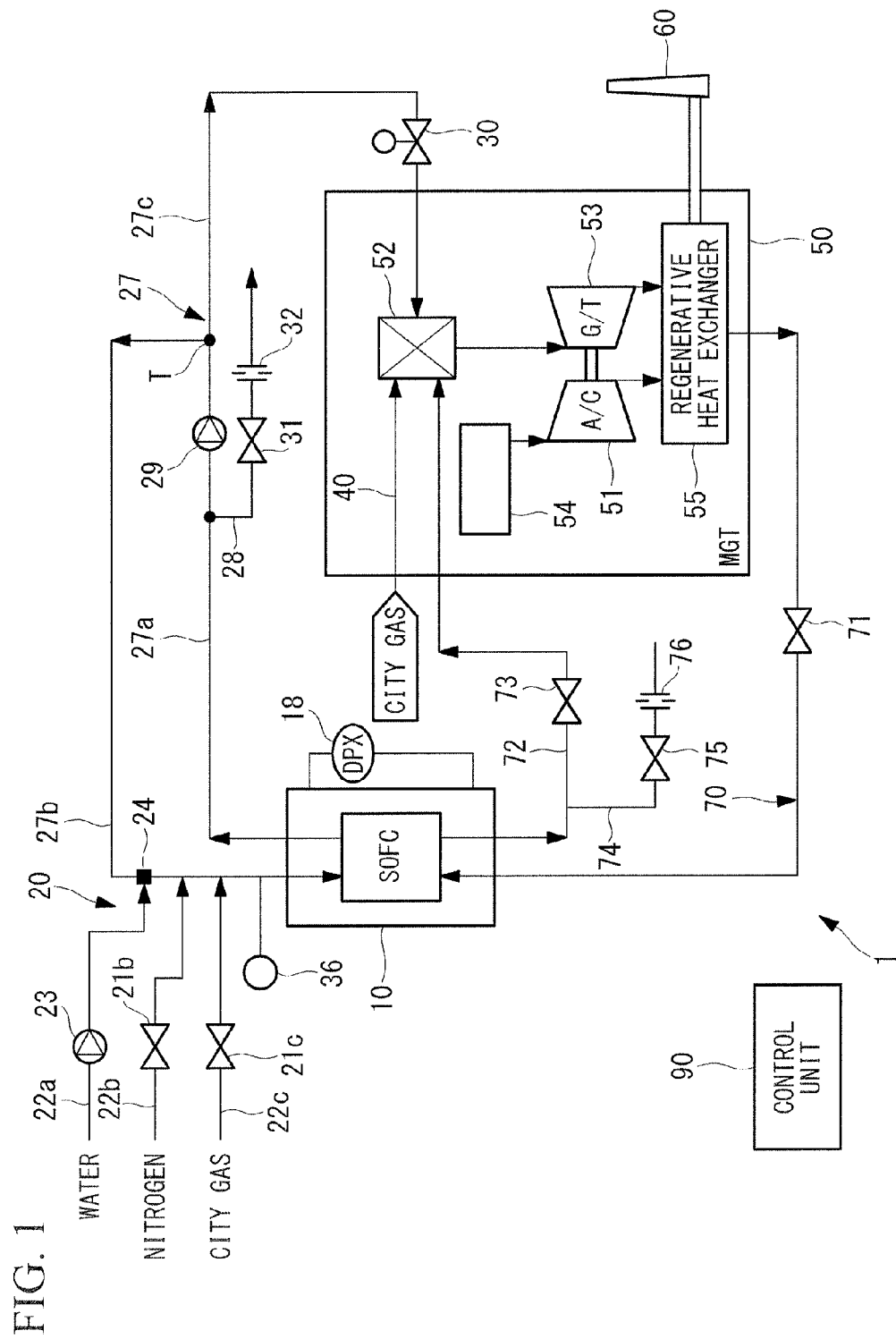
FIG. 1 is a schematic configuration diagram of a combined power generation system according to the present invention.

A combined power generation system 1 shown in FIG. 1 is provided with an SOFC 10, which is a high-temperature type fuel cell, a micro gas turbine (hereinafter, referred to as "MGT") 50, which is an example of gas turbines and gas engines, that is to say, internal combustion engines, and a control unit 90, and performs efficient power generation by combining the SOFC 10 and the MGT 50.

Specifically, in addition to the SOFC 10 that generates power by means of electrochemical reactions via an electrolyte by receiving supplies of fuel gas, which is reformed from city gas (natural gas) or the like, and oxidizing gas such as air or the like, the MGT 50 is operated by using combustion gas by introducing high-temperature exhaust fuel and exhaust air expelled from the SOFC 10 after generating power into a combustor, and power is generated by driving a generator (not shown) coupled with an output shaft of the MGT 50. Note that, oxidizing gas is gas containing substantially 15 to 30% oxygen, and, although air is typically preferable, aside from air, a mixed gas containing combustion exhaust gas and air, a mixed gas containing oxygen and air, or the like can be used.

Furthermore, by introducing the high-temperature combustion exhaust gas to the exhaust-heat recovery boiler expelled from the MGT 50, it is also possible to construct a combined power generation system combined with power generation based on a steam turbine that is driven by the generated vapor.

In the following, the combined power generation system 1 employing the above-described SOFC 10 will be described. This SOFC 10 employs ceramics, such as zirconia ceramics, as an electrolyte, and is operated (generates power) by using city gas, natural gas, oil, methanol, coal gasification gas, or the like as fuel, and the operating temperature thereof is set high, at about 800 to 1000° C., in order to increase the ionic conductivity.

In the following, for the convenience of explaining, although positional relationships of individual components will be specified by using expressions "top" and "bottom" with reference to the plane of the figures, this need not necessarily correspond to top and bottom in the vertical direction. For example, the top direction in the plane of a figure may correspond to the bottom direction in the vertical direction. In addition, the top-to-bottom direction in the plane of a figure may correspond to the horizontal direction that is perpendicular to the vertical direction.

In addition, in the following, although a cell stack of the solid oxide fuel cell (SOFC) will be described by using a cylindrical shape as an example, the shape thereof need not necessarily be limited thereto, and, for example, the cell stack may have a flat plate shape.

Figure 2:
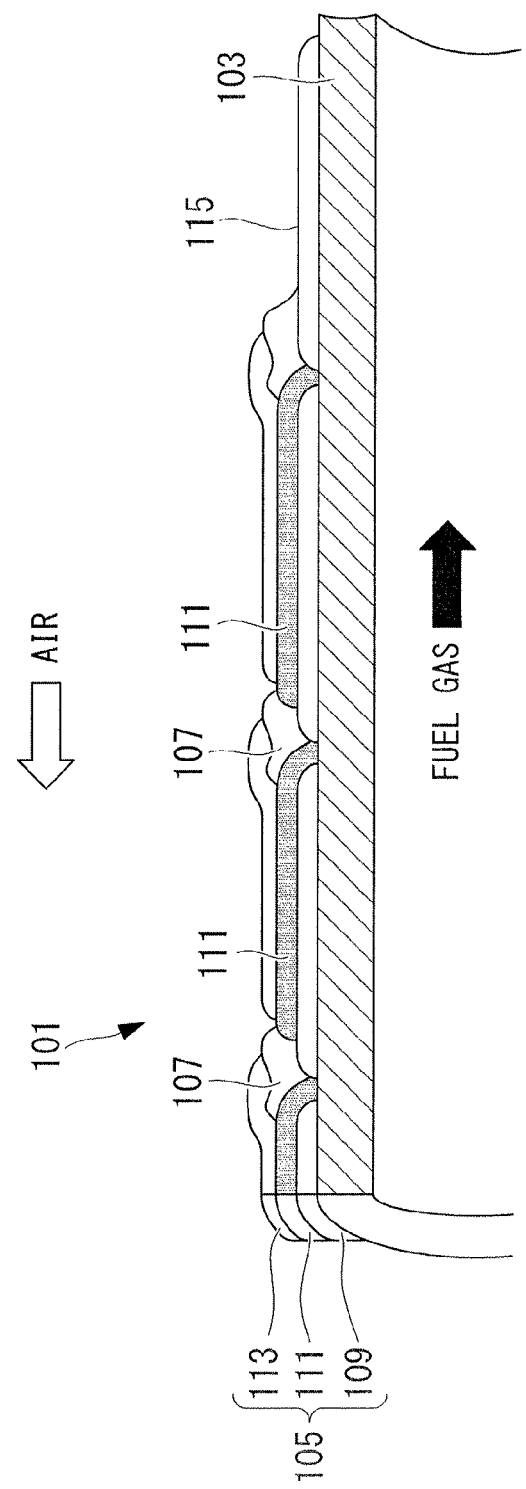
FIG. 2 is a sectional view of an example cell stack for an SOFC that constitutes the combined power generation system shown in FIG. 1.

A cylindrical cell stack according to this Example will be described with reference to FIG. 2. Here, FIG. 2 shows a form of the cell stack according to this embodiment. A cell stack 101 has a cylindrical substrate tube 103, a plurality of fuel-cell cells 105 formed on an outer circumferential surface of the substrate tube 103, and interconnectors 107 formed between adjacent fuel-cell cells 105. The fuel-cell cells 105 are formed by stacking fuel electrodes (anode) 109, solid electrolytes 111, and air electrodes (cathode) 113. In addition, among the plurality of fuel-cell cells 105 formed on the outer circumferential surface of the substrate tube 103, the cell stack 101 has a lead film 115 that is electrically connected to the air electrode (cathode) 113 of the fuel-cell cell 105 formed at the furthest end of the substrate tube 103 in the axial direction via the interconnector 107 thereof.

The substrate tube 103 is formed of a porous material, namely, for example, CaO stabilized $ZrO_2$ (CSZ: calcia stabilized zirconia), $Y_2O_3$ stabilized $ZrO_2$ (YSZ: yttria stabilized zirconia), or $MgAl_2O_4$. The substrate tube 103 supports the fuel-cell cells 105, the interconnectors 107, and the lead film 115, and also allows the fuel gas that is supplied to an inner circumferential surface of the substrate tube 103 to diffuse toward the fuel electrodes (anode) 109 formed at an outer circumferential surface of the substrate tube 103 via micropores of the substrate tube 103.

The fuel electrodes (anode) 109 are formed of an oxide of a composite material of Ni and a zirconia-based electrolyte material, and, for example, Ni/YSZ is used. With the fuel electrodes (anode) 109 in this case, Ni, which is the component of the fuel electrodes (anode) 109, has a catalytic effect on the fuel gas. This catalytic effect causes the fuel gas supplied via the substrate tube 103, for example, a mixed gas containing methane ($CH_4$) and water vapor, to react, thus reforming the mixed gas into hydrogen ($H_2$) and carbon monoxide (CO). In addition, the fuel electrodes (anode) 109 cause hydrogen ($H_2$) and carbon monoxide (CO) obtained by the reformation to electrochemically react with oxygen ions ($O^{2-}$) supplied via the solid electrolytes 111 in the vicinity of the interfaces with the solid electrolytes 111, thus generating water ($H_2O$) and carbon dioxide ($CO_2$). Note that, at this time, the fuel-cell cells 105 generate power by means of electrons released from the oxygen ions.

YSZ, which has airtightness with low gas permeability and high oxygen-ion conductivity at high temperature, is mainly used for the solid electrolytes 111. The solid electrolytes 111 allow the oxygen ions ($O^{2-}$) generated at the air electrodes (cathode) 113 to move toward the fuel electrodes (anode) 109.

The air electrodes (cathode) 113 are formed of, for example, a $LaSrMnO_3$-based oxide or a $LaCoO_3$-based oxide. In the vicinity of the interfaces with the solid electrolytes 111, the air electrodes (cathode) 113 generate the oxygen ions ($O^{2-}$) by dissociating oxygen in oxidizing gas, such as the supplied air or the like.

The interconnectors 107 are formed of a conductive perovskite oxide denoted as $M_{1-x}L_xTiO_3$ (M is an alkaline earth metal element and L is a lanthanoid element), such as a $SrTiO_3$-based oxide, and form a dense film so as to prevent mixing of the fuel gas and the oxidizing gas. In addition, the interconnectors 107 have stable electrical conductivity both in an oxidizing atmosphere and a reducing atmosphere. The interconnectors 107 electrically connect the air electrode (cathode) 113 of one of the fuel-cell cells 105 and the fuel electrode (anode) 109 of the other fuel-cell cell 105 in the adjacent fuel-cell cells 105, thus connecting the adjacent fuel-cell cells 105 with each other in series. The lead film 115 is formed of a composite material of Ni and a zirconia-based electrolyte material, such as Ni/YSZ or the like, because the lead film 115 needs to have electron conductivity and a thermal expansion coefficient that is close to those of other materials forming the cell stack 101. The lead film 115 leads out the DC electric power generated by the plurality of fuel-cell cells 105 connected in series by the interconnectors 107 to the vicinity of the end portion of the cell stack 101.

The fuel electrodes (anode) 109 receive a supply of fuel, such as natural gas or the like, from a fuel supplying system 20, and expel the fuel gas supplied to the SOFC 10 to a fuel-gas exhausting system 27.

The air electrodes (cathode) 113 receive a supply of air from an oxidizing-gas supplying system 70, and expel high-temperature exhaust air that has been utilized in electrochemical reactions to an oxidizing-gas exhausting system 72. The oxidizing-gas supplying system 70 is connected to a compressor 51 of a turbine 53, to be described below, and the oxidizing-gas exhausting system 72 is connected to a combustor 52 of the turbine 53.

Note that an SOFC module has a plurality of SOFC cartridges 11 (see FIG. 3) and a pressure vessel 81 that accommodates the plurality of SOFC cartridges.

Figure 3:
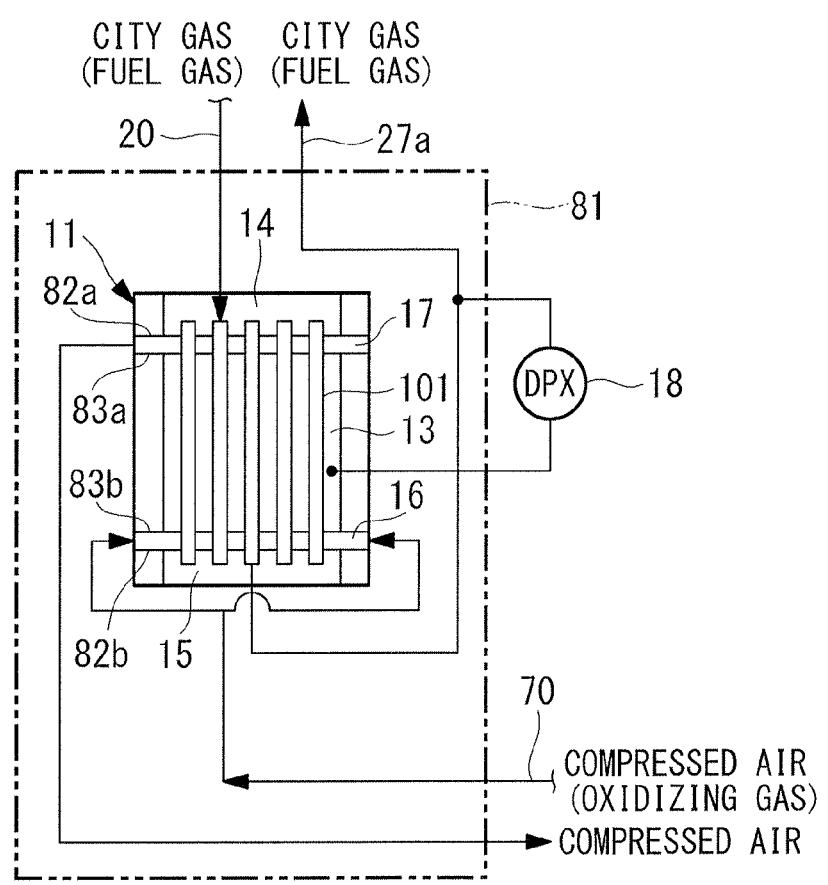
FIG. 3 is a system diagram in which a cartridge and the peripheries thereof are enlarged, in the SOFC that constitutes the combined power generation system shown in FIG. 1.

As shown in FIG. 3, each SOFC cartridge 11 includes a plurality of cell stacks 101, a power generation chamber 13, a fuel-gas supplying chamber 14, a fuel-gas exhausting chamber 15, an oxidizing-gas supplying chamber 16, and an oxidizing-gas exhausting chamber 17.

The SOFC cartridges 11 of this embodiment have tube plates 82a and 82b that partition the space in the longitudinal direction of the cell stacks 101 to form the fuel-gas supplying chamber 14 and the fuel-gas exhausting chamber 15, a heat insulation plate 83b that partitions the space in the longitudinal direction of the cell stacks 101 to form the oxidizing-gas supplying chamber 16 between the tube plate 82b and the heat insulation plate 83b, and a heat insulation plate 83a that forms the oxidizing-gas exhausting chamber 17 between the tube plate 82a and the heat insulation plate 83a, and, as shown in FIG. 3, the fuel-gas supplying chamber 14, the oxidizing-gas exhausting chamber 17, the power generation chamber 13, the oxidizing-gas supplying chamber 16, and the fuel-gas exhausting chamber 15 are formed and disposed in this order from top to bottom in the plane of the figure.

By arranging the fuel-gas supplying chamber 14, the fuel-gas exhausting chamber 15, the oxidizing-gas supplying chamber 16, and the oxidizing-gas exhausting chamber 17, a structure in which the fuel gas and the oxidizing gas flow in opposite directions inside and outside the cell stacks 101 is formed. However, it is not necessarily limited to this arrangement and structure, and, for example, the flows inside and outside the cell stacks may be parallel to each other or the oxidizing gas may be made to flow in a direction perpendicular to the longitudinal direction of the cell stacks.

The power generation chamber 13 is a region formed between the oxidizing-gas supplying chamber 16 and the oxidizing-gas exhausting chamber 17. This power generation chamber 13 is a region in which the fuel-cell cells of the cell stacks 101 are disposed, and in which power is generated by making the fuel gas and the oxidizing gas electrochemically react with each other. In addition, the temperature near the center portion of the power generation chamber 13 in the longitudinal direction of the cell stacks 101 reaches high-temperature atmosphere of about 800 to 1000° C. during steady state operation of the fuel-cell module.

In the fuel-gas supplying chamber 14, first end portions of the cell stacks 101 are disposed so that the interiors of the substrate tubes 103 of the cell stacks 101 are open toward the fuel-gas supplying chamber 14. This fuel-gas supplying chamber 14 guides the fuel gas, which is supplied thereto from a fuel-gas supplying pipe branch (not shown) via a fuel-gas supplying hole, to the interiors of the substrate tubes 103 of the plurality of cell stacks 101 at a substantially uniform flow volume to make the power generation performance of the plurality of cell stacks 101 substantially uniform.

In the fuel-gas exhausting chamber 15, second end portions of the cell stacks 101 are disposed so that the interiors of the substrate tubes 103 of the cell stacks 101 are open toward the fuel-gas exhausting chamber 15. This fuel-gas exhausting chamber 15 collects the exhaust fuel gas that passes through the interiors of the substrate tubes 103 of the plurality of cell stacks 101 and that is supplied to the fuel-gas exhausting chamber 15 and guides the exhaust fuel gas to a fuel-gas exhausting pipe branch via a fuel-gas exhausting hole (not shown).

In this embodiment, due to the structure of the SOFC cartridges 11 described above, the fuel gas and the oxidizing gas flow in opposite directions inside and outside of the cell stacks 101. Because of this, the exhaust oxidizing gas undergoes heat exchange with the fuel gas that passes through the interiors of the substrate tubes 103 and that is supplied to the power generation chamber 13, is cooled to a temperature at which a deformation such as buckling or the like does not occur in a top-portion tube plate or the like that is formed of a metal material, and is supplied to the oxidizing-gas exhausting chamber 15. In addition, the fuel gas is heated by heat exchange with the exhaust oxidizing gas expelled from the power generation chamber 13 and is supplied to the power generation chamber 13. As a result, it is possible to supply the power generation chamber 13 with the fuel gas which has been preheated to an appropriate temperature for power generation without employing a heater or the like.

In the following description, although a case in which city gas is used as fuel by reforming it outside or inside the SOFC 10 and air is used as oxidizing gas will be described, the air in this case is compressed air that is supplied from the MGT 50. Alternatively, the air may be supplied by separately providing an air compressor.

As shown in FIG. 1, the MGT 50 is provided with, for example, the compressor 51, the combustor 52, and the turbine 53. Note that, in the figure, reference sign 54 indicates a filter and 55 indicates a regenerative heat exchanger. The compressor 51 compresses the atmosphere (air) introduced via the filter 54, and, in this case, the turbine 53 serves as the driving source thereof. The compressed air that has been compressed at the compressor 51 is supplied to the SOFC 10 or the like via the combustor 52 and the regenerative heat exchanger 55. The combustor 52 combusts city gas, which is the fuel, by receiving the supplied compressed air, generates high-temperature, high-pressure combustion exhaust gas, and supplies it to the turbine 53. An exhaust-fuel-gas supplying line 27c, to be described below, and a fuel-gas supplying system 40 that supplies unused city gas (fuel gas) are connected to this combustor 52.

The turbine 53 is rotated by the energy of the combustion exhaust gas and generates shaft output, and the compressor 51 and a generator (not shown) are driven by utilizing this shaft output. The combustion exhaust gas that has performed work at the turbine 53 is released into the atmosphere from a stack 60 after heating the compressed air at the regenerative heat exchanger 55 by means of heat exchange therewith.

The combined power generation system 1 is a system that generates power by combining the SOFC 10 and the MGT 50, and is provided with the fuel supplying system 20 that supplies fuel to the fuel electrodes (anode) 109 and the oxidizing-gas supplying system 70 that supplies oxidizing gas to the air electrodes (cathode) 113.

The fuel supplying system 20 is provided with a water supplying line 22a provided with a feed pump 23, a nitrogen supplying line 22b provided with a nitrogen-supplying valve (open/close valve) 21b, and a city-gas (fuel-gas) supplying line 22c provided with a city-gas supplying valve (open/close valve) 21c.

The water supplying line 22a is provided with a water supplying portion (water supplying means) 24 at a portion joining with a recirculating line 27b (to be described below). This embodiment will be described assuming that the water supplying portion 24 is a spray (spraying means) that supplies water by means of spraying. By spraying water from the water supplying portion 24, water is supplied to the recirculating line 27b. When water is sprayed from the water supplying portion 24, water is vaporized because the exhaust fuel gas circulating in the recirculating line 27b is at a high temperature (for example, 250 to 500° C.), and thus, vapor is supplied to the SOFC 10.

The fuel-gas exhausting system 27 is a channel that feeds the fuel gas supplied to the SOFC 10 to the MGT 50. This fuel-gas exhausting system 27 is provided with an exhaust fuel gas line 27a that has an exhaust fuel blower (blower) 29, an exhaust-fuel-gas supplying line 27c that is connected to the MGT 50 via the exhaust fuel gas line 27a, and the recirculating line 27b that splits off from the exhaust-fuel-gas supplying line 27c via the exhaust fuel gas line 27a and that circulates (recirculates) the exhaust fuel gas to the SOFC 10.

The recirculating line 27b is a channel that is connected to the fuel supplying system 20 and is a channel for returning (recirculating) the exhaust fuel gas to the SOFC 10.

In addition, at a vent line 28 that splits off on the upstream side of a branching point T where the exhaust-fuel-gas supplying line 27c splits off to the recirculating line 27b, a fuel-vent shut-off valve (shut-off valve) 31 that expels exhaust fuel gas and water is provided. An orifice (pressure loss means) 32 that causes a predetermined amount of pressure loss in the exhaust fuel gas line 27a is provided on the downstream side of the fuel-vent shut-off valve 31.

Note that, in the recirculating line 27b, a temperature sensor 36 is provided at a portion between a position at which spray water is sprayed from the water supplying portion 24 (joining point of the spray water and the exhaust fuel gas) and an inlet of the SOFC 10.

The exhaust-fuel-gas supplying line 27c is a channel that supplies the exhaust fuel gas from the SOFC 10 to the combustor 52 of the MGT 50 via the flow-rate adjusting valve 30.

A DPX (system-pressure-difference measuring means) 18 measures a pressure difference between the fuel system and the air system of the SOFC 10 and outputs the measurement to the control unit 90.

The illustrated oxidizing-gas supplying system 70 is a channel that supplies the compressed air (oxidizing gas) that has been compressed at the compressor 51 of the MGT 50 and that has undergone heat exchange at the regenerative heat exchanger 55 to the air electrodes (cathode) 113 of the SOFC 10. In addition, a shut-off valve 71 is provided in the oxidizing-gas supplying system 70, and the shut-off valve 71 is closed when the oxidizing gas is to be contained in the SOFC 10.

In addition, the oxidizing-gas exhausting system 72 is a channel that supplies the exhaust oxidizing gas, which has been supplied to the SOFC 10 and used thereat to generate power, to the MGT 50 and that connects the SOFC 10 and the MGT 50. A shut-off valve 73 is provided in the oxidizing-gas exhausting system 72, and the shut-off valve 73 is closed when the oxidizing gas is to be contained in the SOFC 10. In addition, an air vent line 74 is provided, splitting off from the oxidizing-gas exhausting system 72, and the air vent line 74 is provided with a shut-off valve 75, which expels the exhaust oxidizing gas, and an orifice 76 on the downstream side of the shut-off valve 75. For example, when the power generation by the SOFC 10 comes to an abnormal stop (tripped), the exhaust oxidizing gas is vented from the air vent line 74.

The oxidizing-gas supplying system 70 is a channel that supplies a portion of the compressed air compressed at compressor 51 of the MGT 50 to the air electrodes (cathode) 113 of the SOFC 10. The oxidizing-gas supplying system 70 supplies the compressed air that has undergone heat exchange at the regenerative heat exchanger 55 to the SOFC 10.

Here, a trip operation refers to performing a stop operation by detecting an abnormality, which includes cases involving non-serious failures due to a voltage abnormality, a temperature abnormality, or the like, which do not require containment, and cases involving serious failures due to, for example, a power outage or a failure of the control unit 90, which do require containment.

For example, when the power generation by the SOFC 10 is normally stopped or when the trip operation other than the containment is performed, although there are fluctuating factors of the system pressure difference due to a depressurizing manipulation or a temperature drop or the like resulting from depressurizing, it is possible to prevent such fluctuations in the system pressure difference by spraying water (supplying water) to the recirculating line 27b, as described above.

In addition, for example, in the case in which containment is necessary due to a power outage or a failure of the control unit 90, although the fuel supplying system 20 and the oxidizing-gas supplying system 70 are shut off and, in addition, the fuel-gas exhausting system 27 and the oxidizing-gas exhausting system 72 are also shut off, thus containing the fuel gas and the compressed air in the SOFC 10, if left as is, the temperature in the system will decrease over time.

Because of this, because the system between the fuel supplying system 20 and the fuel-gas exhausting system 27, which falls within the system of the SOFC 10, and the system between the oxidizing-gas supplying system 70 and the oxidizing-gas exhausting system 72 are shut off from the supply sources of the fuel gas and the compressed air, aeration gas cannot be replenished therein, and, in addition, because they are also shut off from the fuel-gas exhausting system 27 and the oxidizing-gas exhausting system 72, the system pressure difference consequently increases in association with a temperature drop in the system of the SOFC 10 and gas leaks from the individual systems and from sections between the systems. Water is sprayed in the case in which the fuel system pressure becomes lower than the air system pressure, and the fuel-vent shut-off valve 31 is opened in the case in which the fuel system pressure becomes greater than the air system pressure.

Note that, in this embodiment, the case in which the fuel system pressure becomes greater than the air system pressure is assumed to be positive pressure (indicated by plus sign), and the case in which the fuel system pressure becomes lower than the air system pressure is assumed to be negative pressure (indicated by minus sign).

The control unit 90 is configured to include, for example, a CPU (Central Processing Unit), a RAM (Random Access Memory), a computer-readable recording medium, and so forth, which are not illustrated. Processes in the processing sequence for realizing various functions described below are recorded in a recording medium or the like in the forms of programs, and the CPU reads out these programs to the RAM, or the like to execute information manipulation and computational processing, thus realizing various functions described below.

When stopping the power generation by the SOFC 10 or when the power generation by the SOFC 10 comes to an abnormal stop (tripped), the control unit 90 opens the fuel-vent shut-off valve 31, while causing the predetermined amount of pressure loss in the vent line 28 via the orifice 32, and controls the water flow volume of the spray so that the pressure difference, which is measured by the DPX 18, reaches a predetermined value (a predetermined amount of pressure difference: for example, 0.5 kPa), thus controlling the system pressure difference between the air system and the fuel system of the SOFC 10.

In addition, in the case in which positive pressure cannot be maintained on the fuel side by supplying water, the fuel system pressure may be increased by shutting the fuel-vent shut-off valve 31 (by closing the fuel-vent shut-off valve 31).

In addition, in the case in which containment is required when the power generation by the SOFC 10 comes to an abnormal stop, the control unit 90 causes the spray to supply water when the fuel system pressure becomes lower than the air system pressure by an amount equal to or greater than a predetermined pressure, thus adjusting the fuel system pressure.

In addition, in the case in which containment is required when the power generation by the SOFC 10 comes to an abnormal stop, the control unit 90 opens the fuel-vent shut-off valve 31 when the fuel system pressure becomes greater than the air system pressure by an amount equal to or greater than a predetermined pressure, thus adjusting the fuel system pressure.

The operation of the control unit 90 of the combined power generation system 1 according to this embodiment will be described below by using FIG. 1, FIG. 4, and FIG. 5.

In a coordinated operation (combined operation) of the SOFC 10 and the MGT 50 of the combined power generation system 1, city gas that serves as fuel is injected into the SOFC 10, and the chemical energy of the fuel is directly converted to electric power by the SOFC 10. Subsequently, the exhaust fuel gas from the SOFC 10 is supplied to the combustor 52 of the MGT 50. Meanwhile, air introduced via the filter 54 is supplied to the SOFC 10 after being pressurized at the compressor 51 of the MGT 50 and a portion thereof is used as an oxidant (oxidizing gas), after which the air fed to the MGT 50 again while possessing high-temperature exhaust heat, and the sensible heat and the pressure possessed by the air, as forms of energy, are also converted to electric power at the MGT 50 at the downstream side of the system, thus making it possible for the system as a whole to achieve a high power generation efficiency.

Figure 4:
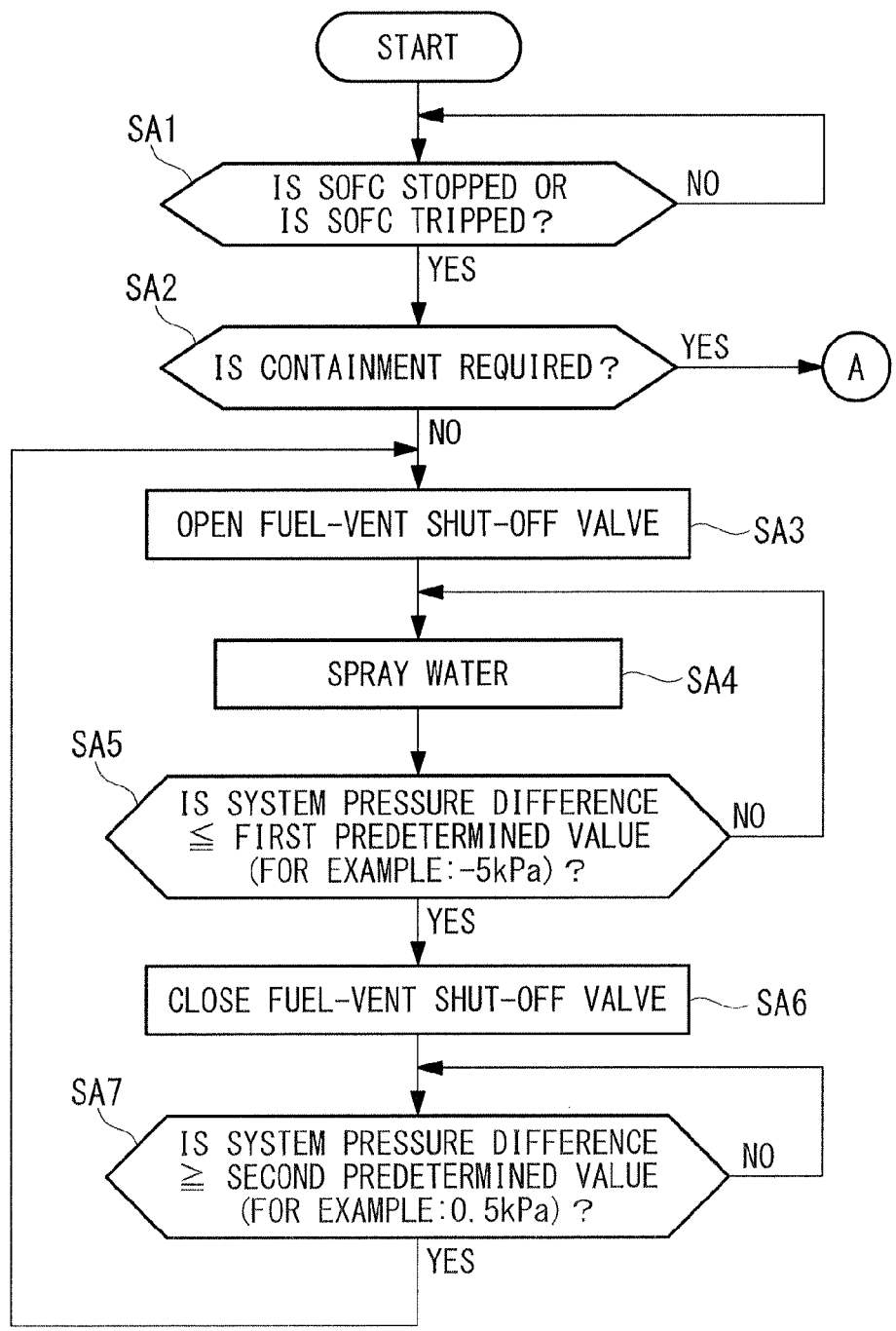
FIG. 4 shows an operation flow of a control unit of the combined power generation system according to the present invention.

In the case in which the temperature of the exhaust fuel gas is equal to or greater than a predetermined temperature (for example, 200° C.) in the recirculating line 27b, it is judged whether or not a stop instruction of the SOFC 10 or a trip of the SOFC 10 has been detected (step SA1 in FIG. 4), and the judgment is repeated if the stop instruction or trip has not been detected (No in step SA1 in FIG. 4).

In the case in which stopping of the power generation by the SOFC 10 or tripping of the power generation by the SOFC 10 has been detected (Yes in step SA1 in FIG. 4), it is judged whether or not containment is required (step SA2 in FIG. 4). If it is judged that containment is required (Yes in step SA2 in FIG. 4), the process proceeds to FIG. 5.

In the case in which it is judged that containment is not required (No in step SA2 in FIG. 4), the fuel-vent shut-off valve 31 of the vent line 28 is opened (step SA3 in FIG. 4).

Then, the city-gas supplying valve 21c is opened so as to supply city gas at a certain flow volume, and water that has been circulated in the water supplying line 22a via the feed pump 23 is supplied to the recirculating line 27b by being sprayed thereonto (step SA4 in FIG. 4).

The water sprayed to the recirculating line 27b is vaporized to form vapor and is supplied to the fuel electrodes (anode) 109. The system pressure difference of the SOFC 10 is controlled in this way.

It is judged whether or not the system pressure difference of the SOFC 10 is equal to or less than a first predetermined value (for example, −5 kPa) (step SA5 in FIG. 4). If the system pressure difference of the SOFC 10 is greater than the first predetermined value (No in step SA5 in FIG. 4), the process returns to step SA4. If the system pressure difference of the SOFC 10 is equal to or less than the first predetermined value (Yes in step SA5 in FIG. 4), that is, in the case in which it is judged that the system pressure difference cannot be maintained at a positive pressure by the sprayed water (the system pressure difference is equal to or less than the first predetermined value), the fuel-vent shut-off valve 31 is shut (closed) (step SA6 in FIG. 4). The system pressure difference is controlled in this way so as to be greater than the first predetermined value.

In the case in which it is judged whether or not the system pressure difference is equal to or greater than a second predetermined value (for example, 0.5 kPa), which is greater than the first predetermined value (step SA7 in FIG. 4), if the system pressure difference is less than the second predetermined value (No in step SA7 in FIG. 4), step SA6 is repeated, and if the system pressure difference is equal to or greater than the second predetermined value (Yes in step SA7 in FIG. 4), the process returns to step SA3 and this processing is repeated so as to reach the predetermined value.

Figure 5:
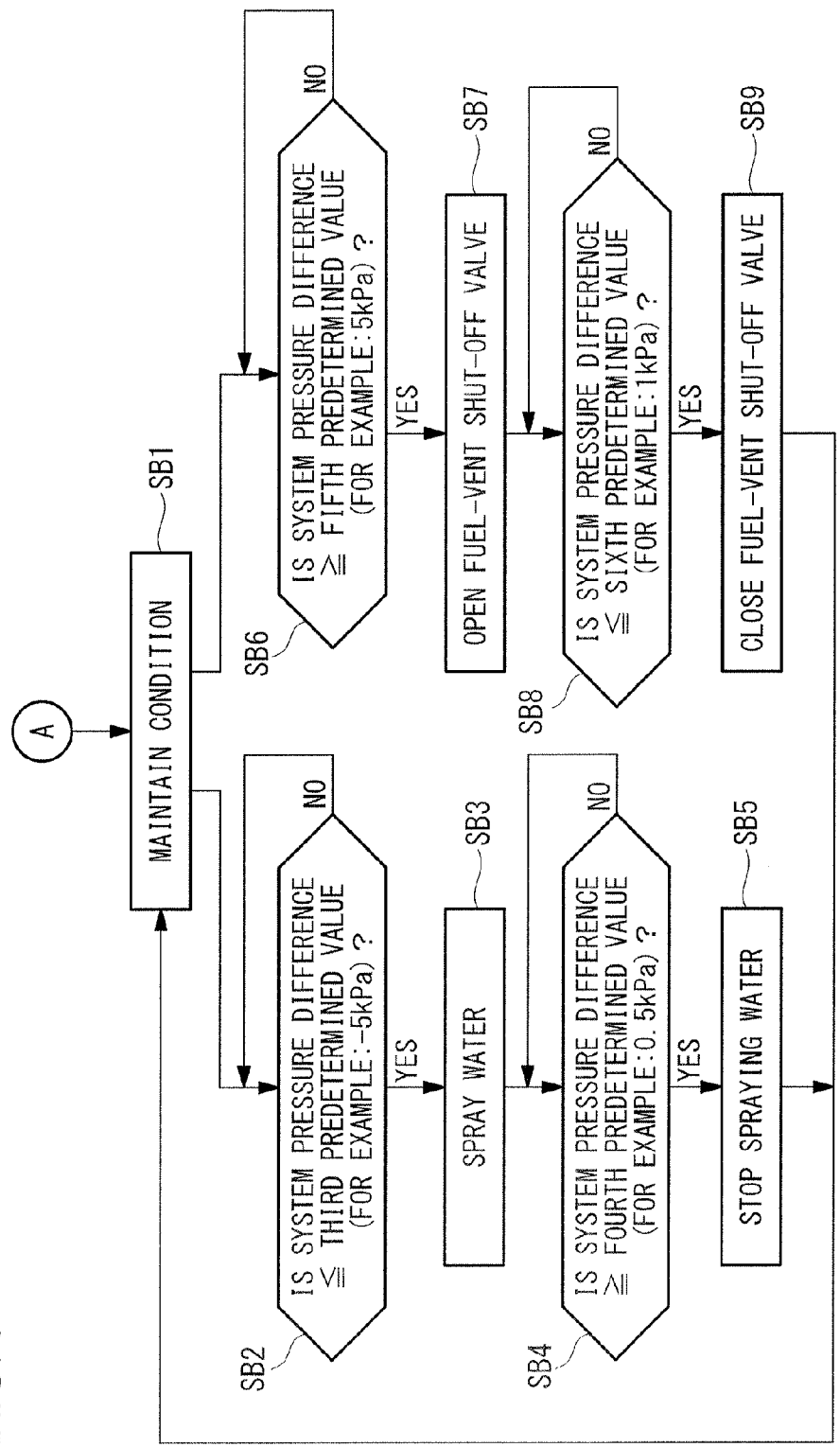
FIG. 5 shows a continuation of the operation flow of the control unit of the combined power generation system shown in FIG. 4.

In addition, when it is judged that containment is required in step SA2 in FIG. 4, the process proceeds to FIG. 5 and the contained state is maintained (step SB1 in FIG. 5). In the case in which it is judged whether or not the system pressure difference is equal to or less than a third predetermined value (for example, −5 kPa) (step SB2 in FIG. 5), if it is judged to be greater than the third predetermined value (No in step SB2 in FIG. 5), this step is repeated, and if it is judged to be equal to or less than the third predetermined value (Yes in step SB2 in FIG. 5), the water that has been circulated in the water supplying line 22a via the feed pump 23 is supplied to the recirculating line 27b by being sprayed thereonto (step SB3 in FIG. 5). The water sprayed onto the recirculating line 27b is vaporized to form vapor and is supplied to the fuel electrodes (anode) 109. The system pressure difference of the SOFC 10 is controlled in this way.

In the case in which it is judged whether or not the system pressure difference is equal to or greater than a fourth predetermined value (for example, 0.5 kPa), which is greater than the third predetermined value (step SB4 in FIG. 5), if the system pressure difference is less than the fourth predetermined value, water spraying in step SB3 is repeated (No in step SB4 in FIG. 5), and if it is judged that the system pressure difference is equal to or greater than the fourth predetermined value (Yes in step SB4 in FIG. 5), water spraying is stopped (step SB5 in FIG. 5) and the process returns to step SB1 in FIG. 5, thus maintaining the conditions.

In addition, in the case in which the contained state in step SB1 in FIG. 5 is maintained and in which it is judged whether or not the system pressure difference is equal to or greater than a fifth predetermined value (for example, 5 kPa) together with the judgment in step SB2 (step SB6 in FIG. 5), if the system pressure difference is less than the fifth predetermined value (No in step SB 6 in FIG. 5), this step is repeated, and if the system pressure difference is equal to or greater than the fifth predetermined value (Yes in step SB6 in FIG. 5), the fuel-vent shut-off valve 31 of the vent line 28 is opened (step SB7 in FIG. 5). Subsequently, in the case in which it is judged whether or not the system pressure difference is equal to or less than a sixth predetermined value (for example, 1 kPa), which is less than the fifth predetermined value (step SB8 in FIG. 5), if the system pressure difference is greater than the sixth predetermined value (No in step SB8 in FIG. 5), this step is repeated, and if the system pressure difference is equal to or less than the sixth predetermined value (Yes in step SB8 in FIG. 5), the fuel-vent shut-off valve 31 is closed (step SB9 in FIG. 5) and the process returns to step SB1 in FIG. 5, thus maintaining the contained state.

As has been described above, with the combined power generation system 1 according to this embodiment, the control unit 90, the control method, and the control program therefor, the fuel-vent shut-off valve 31 that is provided in the vent line 28, which splits off on the upstream side of the branching point T at which the exhaust-fuel-gas supplying line 27c splits off to the recirculating line 27b, is opened, and water is supplied from the recirculating line 27b. The water supplied from the recirculating line 27b is vaporized by the high-temperature exhaust fuel gas circulating in the recirculating line 27b to form vapor, and is supplied to the SOFC 10 side. By supplying water to the recirculating line 27b in this way, the system pressure difference between the air system and the fuel system of the SOFC 10 is controlled.

With such a configuration, because water, which is lower cost than nitrogen, is used to control the system pressure difference between the air system and the fuel system of a fuel cell, the running cost thereof is suppressed, and thus, a high economic efficiency is achieved. In addition, storage of water is also easy. In addition, cost reduction is achieved by preventing nitrogen from being supplied from the recirculating line 27b.

Although an amount of water ($H_2O$) equal to or greater than a certain amount is required to prevent carbon deposition in the fuel electrodes (anode) 109, because water is supplied in this embodiment, a sufficient amount of water can be ensured, and thus, the risk of not having enough water for preventing carbon deposition is reduced.

In addition, because water is supplied to the recirculating line 27b by spraying water, vaporization thereof is facilitated, and the pressure difference can be controlled in a simple manner.

Although back pressure cannot be adjusted during an interlock or trip operation in the case in which the MGT 50 has failed or the like, it is possible to adjust the pressure on the water supply side by shutting the fuel-vent shut-off valve 31 of the vent line 28. In this way, it is possible to quickly respond to an increase in the fuel system pressure by intermittently operating the fuel-vent shut-off valve 31. In addition, because the fuel-vent shut-off valve 31 employs a shut-off valve and a shut-off valve is lower cost than a control valve, the cost can be suppressed with this embodiment.

{Modification}

In this embodiment, although the system pressure difference is controlled by spraying water from the recirculating line 27b when stopping the power generation by the SOFC 10 or when the power generation comes to an abnormal stop (tripped), it is not limited thereto, and nitrogen may be supplied together with supplying water. Specifically, when controlling the system pressure difference, a nitrogen-supplying valve 21b is opened so that a predetermined amount of nitrogen is supplied in addition to spraying water. By supplying nitrogen together with supplying water in this way, it is possible to reduce the amount of time required to control the system pressure difference.

Note that, the present invention is not limited to the embodiment described above, and appropriate alterations are possible within the scope of the present invention.

REFERENCE SIGNS LIST 1 combined power generation system
10 SOFC (solid oxide fuel cell)
18 DPX (system-pressure-difference measuring means)
22a water supplying line
24 water supplying portion (water supplying means)
27a exhaust fuel gas line
27b recirculating line
27c exhaust-fuel-gas supplying line
29 exhaust fuel blower (blower)
30 flow-rate adjusting valve
31 fuel-vent shut-off valve
32 orifice (pressure loss means)
50 MGT (micro gas turbine)
90 control unit
109 fuel electrode (anode)
113 air electrode (cathode)

The invention claimed is:

1. A control unit of a combined power generation system that combines a fuel cell and an internal combustion engine, the combined power generation system comprising:
an exhaust fuel gas line that feeds exhaust fuel gas from the fuel cell by means of a blower;
an exhaust-fuel-gas supplying line that splits off from a branching point of the exhaust fuel gas line and that supplies the exhaust fuel gas to the internal combustion engine;
a recirculating line that splits off from the branching point and that circulates the exhaust fuel gas to the fuel cell;
a shut-off valve that is provided in a vent line that splits off on an upstream side of the branching point;
a pressure loss means that is provided on a downstream side of the shut-off valve in the vent line;
a water supplying means for supplying liquid-phase water to the recirculating line; and
a system-pressure-difference measuring means for measuring a pressure difference between an air system and a fuel system of the fuel cell,
wherein, when stopping power generation by the fuel cell or when the power generation by the fuel cell comes to an abnormal stop,
the control unit opens the shut-off valve, while causing a predetermined amount of pressure loss in the vent line by using the pressure loss means, and thus controls a water flow volume of the water supplying means so that the pressure difference measured by the system-pressure-difference measuring means reaches a predetermined value.

2. A control unit of a combined power generation system according to claim 1, wherein a pressure of the fuel system is adjusted by opening/closing the shut-off valve or by controlling the water flow volume of the water supplying means.

3. A control unit of a combined power generation system according to claim 1, wherein the water supplying means is equipped with a spraying means for supplying the water by means of spraying.

4. A control unit of a combined power generation system according to any one of claim 1, wherein the pressure of the fuel system is adjusted by controlling the water flow volume from the water supplying means and also by controlling a nitrogen-supply flow volume to the recirculating line.

5. A control unit of a combined power generation system according to any one of claim 1, wherein, in a case in which power generation by the fuel cell comes to an abnormal stop and containment is required,
the pressure of the fuel system is adjusted by supplying water from the water supplying means, when the pressure of the fuel system becomes lower than a pressure of the air system by an amount equal to or greater than a predetermined pressure.

6. A control unit of a combined power generation system according to any one of claim 1, wherein, in a case in which power generation by the fuel cell comes to an abnormal stop and containment is required,
the pressure of the fuel system is adjusted by opening the shut-off valve, when the pressure of the fuel system becomes greater than the pressure of the air system by an amount equal to or greater than a predetermined pressure.

7. A combined power generation system provided with a control unit according to any one of claim 1.

8. A control method of a combined power generation system that combines a fuel cell and an internal combustion engine and that is equipped with an exhaust fuel gas line that feeds exhaust fuel gas from the fuel cell by means of a blower, an exhaust-fuel-gas supplying line that splits off from a branching point of the exhaust fuel gas line and that supplies the exhaust fuel gas to the internal combustion engine, a recirculating line that splits off from the branching point and that circulates the exhaust fuel gas to the fuel cell, a shut-off valve that is provided in a vent line that splits off on an upstream side of the branching point, a pressure loss means that is provided on a downstream side of the shut-off valve in the vent line, a water supplying means for supplying liquid-phase water to the recirculating line, and a system-pressure-difference measuring means for measuring a pressure difference between an air system and a fuel system of the fuel cell,
wherein, when stopping power generation by the fuel cell or when the power generation by the fuel cell comes to an abnormal stop, the control method opens the shut-off valve, while causing a predetermined amount of pressure loss in the vent line by using the pressure loss means, and thus controls a water flow volume of the water supplying means so that the pressure difference measured by the system-pressure-difference measuring means reaches a predetermined value.

9. A control program of a combined power generation system that combines a fuel cell and an internal combustion engine and that is equipped with an exhaust fuel gas line that feeds exhaust fuel gas from the fuel cell by means of a blower, an exhaust-fuel-gas supplying line that splits off from a branching point of the exhaust fuel gas line and that supplies the exhaust fuel gas to the internal combustion engine, a recirculating line that splits off from the branching point and that circulates the exhaust fuel gas to the fuel cell, a shut-off valve that is provided in a vent line that splits off on an upstream side of the branching point, a pressure loss means that is provided on a downstream side of the shut-off valve in the vent line, a water supplying means for supplying liquid-phase water to the recirculating line, and a systempressure-difference measuring means for measuring a pressure difference between an air system and a fuel system of the fuel cell, wherein, when stopping power generation by the fuel cell or when the power generation by the fuel cell comes to an abnormal stop, the control program causes a computer to execute control in which the shut-off valve is opened, while causing a predetermined amount of pressure loss in the vent line by using the pressure loss means, and thus, a water flow volume of the water supplying means is controlled so that the pressure difference measured by the system-pressure-difference measuring means reaches a predetermined value.

\* \* \* \* \*